Patented May 20, 1924.

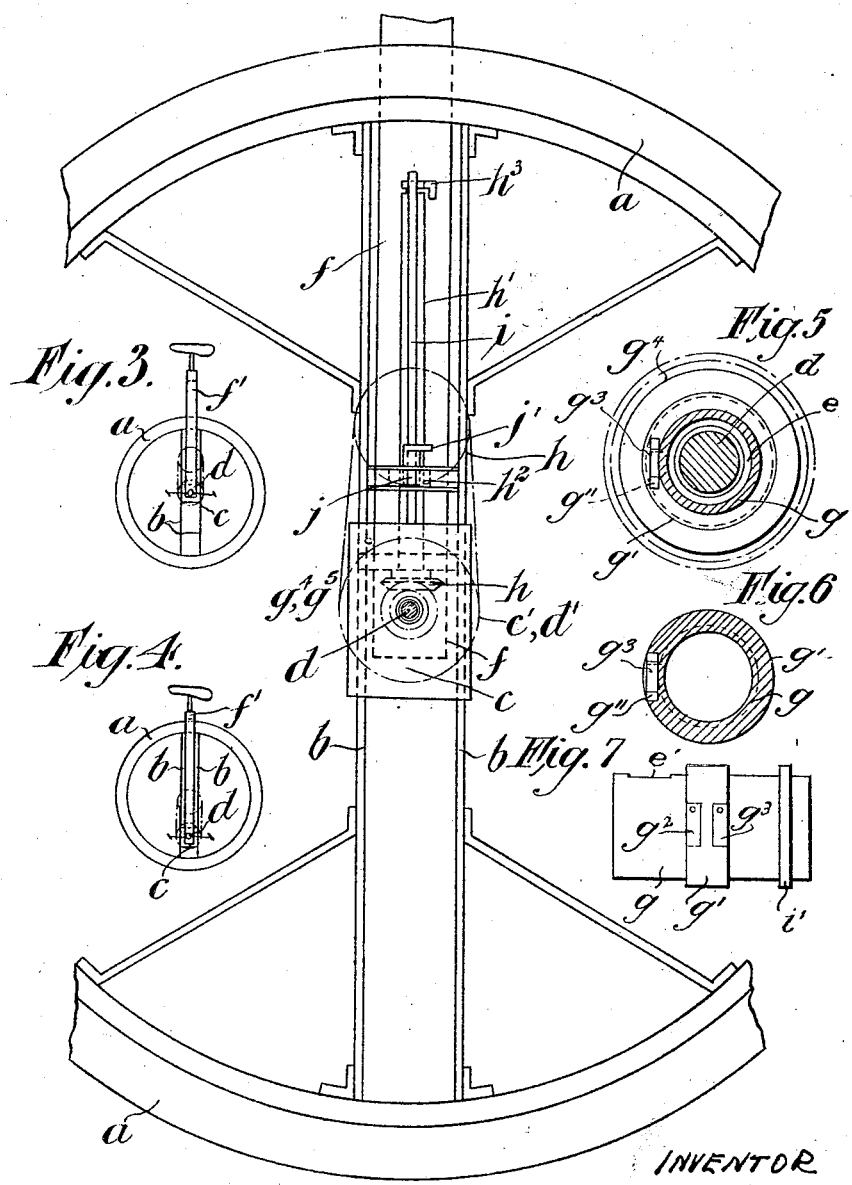

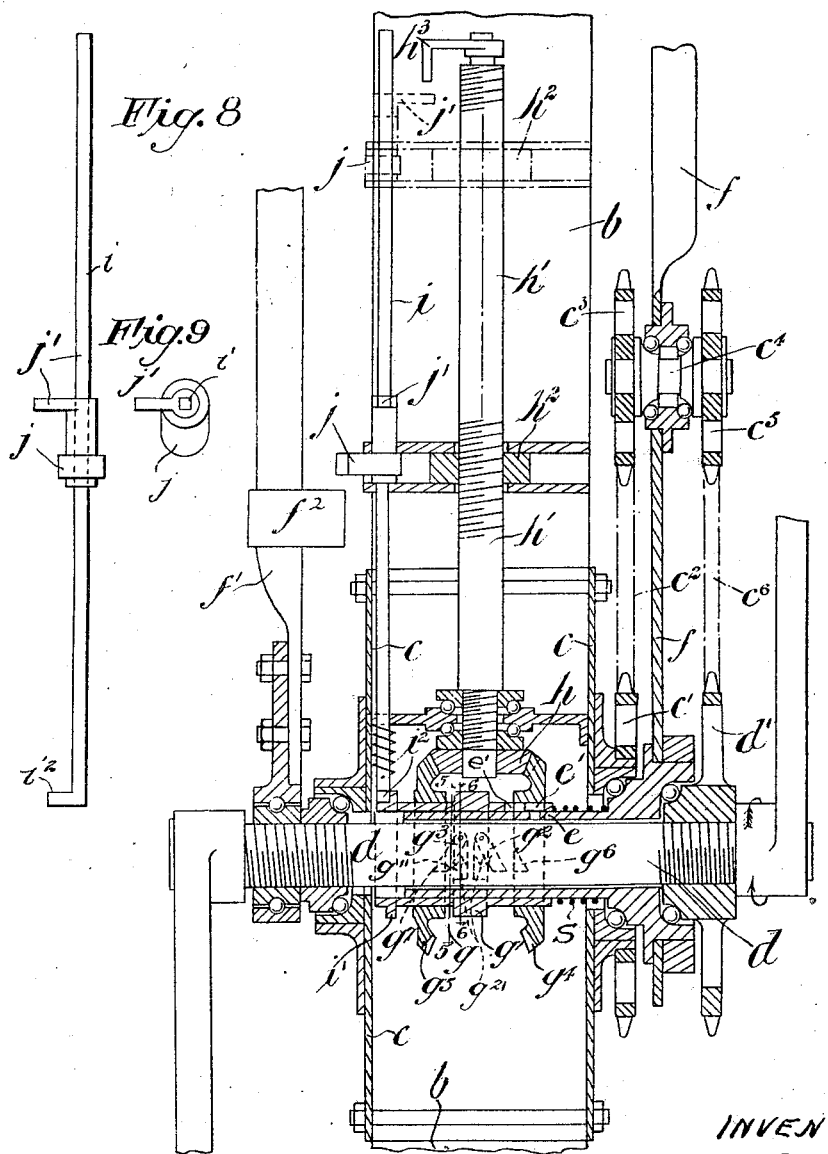

1,494,504

UNITED STATES PATENT OFFICE.

ARTHUR DELORAN ROBBINS, OF LONDON, ENGLAND.

UNICYCLE FOR STAGE OR AMUSEMENT PURPOSES.

Application filed July 19, 1922. Serial No. 576,169.

*To all whom it may concern:*

Be it known that I, ARTHUR DELORAN ROBBINS, a subject of the King of Great Britain and Ireland, and a resident of London, England, have invented a certain new and useful Improvement in Unicycles for Stage or Amusement Purposes, of which the following is a specification.

This invention relates to a unicycle for stage and amusement purposes, and the invention is characterized in that there is imparted to the wheel axle a gradually varying eccentric position to impart to the cycle frame an up and down motion.

For a clear understanding of the invention, reference is to be had to the following description and accompanying sheets of drawings, wherein:—

Figure 1 is a fragmentary side view of a unicycle in accordance with the invention, the hub of said unicycle being shown central with the wheel or in a normal position.

Figure 2 is a sectional view through the hub box, drawn to an enlarged scale, and showing centre of hub box nearly in alignment with centre of wheel.

Figures 3 and 4 are diagrammatic views, showing the cycle frame in its central and normal position, and in its lowest position.

Figure 5 is an enlarged detail sectional view taken through the crank axle and clutch sleeve, on the line 5—5 of Figure 2 and showing one of the bevel gears.

Figure 6 is a detail sectional view of the rib portion of the clutch sleeve more clearly showing one of the clutch dogs, said section being taken on the line 6—6 of Figure 2.

Figure 7 is an enlarged detail elevation of the shiftable clutch sleeve.

Figure 8 is a detail view of the shifter rod.

Figure 9 is a perspective view of the trip member which is slidable on the shifter rod.

Similar reference characters designate corresponding parts throughout the several figures of the drawings.

In the drawings, $a$—Figures 1, 3 and 4—represents the wheel, and $b$, $b$ the diametral slide stays thereof, slidable on the box-like hub $e$, which hub $c$—Figure 2—is rotatable at one end on ball bearings on the crank axle $d$ and at its other end on ball bearings on the sleeve $e$ fixedly mounted in the end of the fork arm $f$. The crank axle $d$ is rotatably mounted in a bearing at the end of the fork arm $f'$, and rotatably mounted on the journal sleeve $e$ in the end of the fork arm $f$.

On the journal sleeve $e$ there is slidably but non-rotatably mounted a clutch sleeve $g$, a pin $e'$, fixedly secured in the fixed sleeve $e$, engaging in a slot $e''$ in the sleeve $g$ preventing said sleeve $g$ from turning. The said sleeve $g$ is provided with a shouldered portion $g'$ having pivotally mounted in oppositely disposed recesses $g''$ the outwardly spring pressed dogs $g^2$, $g^3$, suitable springs being shown at $g^{21}$ on the drawing. On the sleeve $g$, and on each side of the shouldered portion $g'$ thereof, are rotatably mounted the bevel wheels $g^4$, $g^5$ respectively, the bevel wheel $g^4$ being provided with a notch $g^6$ therein, and the bevel wheel $g^5$ with a notch $g^7$ therein, and with which notches the dogs aforesaid are adapted to engage according to which direction the sleeve $g$ is slid.

These wheels $g^4$, $g^5$ are always in mesh with a bevel wheel $h$ carried by a screwed shaft $h'$ screwing in a box nut $h^2$ carried by or secured in any suitable manner to the diametral stays $b$ of the wheel, said shaft $h'$ having at its free end a trip arm $h^3$. Parallel with the shaft $h'$ is a squared shifter rod $i$ which is slidable through a trip member $j$ rotatable in and carried by the box nut $h^2$, being provided with a cranked inner end $i^2$ which engages a flange or disc $i'$ on the slidable but non-rotatable sleeve $g$, the latter being controlled by a spring S.

In action, dog $g^3$ engages in the notch $g^7$ of bevel wheel $g^5$, and wheel $a$ being in motion, the bevel wheel $h$ rolls on the bevel wheel $g^3$, and the nut box $h^2$ and hub box $c$ are drawn towards one another, as in Figure 2, until the arm $j$ of the trip in the nut box engages with the striking plate $f^2$ on the fork $f'$ and as the wheel $a$ continues its rotation, the arm $j$ of the trip member of the box nut $h^2$ is carried around, and said trip member by its engagement with the rod $i$ also turns said rod around, the trip member being provided with a square bore in which the rod $i$ fits and slides.

This turning movement of the rod $i$ effects, by the engagement of its crank end $i^2$ with the flange or disc $i'$ on the sleeve $g$, the pushing of the sleeve $g$ along the fixed sleeve $e$ against the action of the spring S, thus engaging dog $g^2$ with the notch $g^6$ in bevel wheel $g^4$. Rotation of the screw $h'$ is now in reverse direction, with the result that the nut box $h^2$ and hub box $e$ move apart till such time as the trip $h^3$ on screw $h'$ engages the arm $j'$ carried by the trip member $j$ of the nut box $h^2$ turning the rod $i$ and its cranked end $i^2$ back again, allowing the spring S to force the sleeve $g$ back and again engage dog $g^3$ with the notch $g^7$ in the bevel wheel $g^5$ and so on.

By suitably manipulating the trip member of the box nut, the slidable sleeve $g$ may be positioned centrally i. e. the dogs $g^2$, $g^3$ free of the bevel wheels $g^4$, $g^5$ so that the wheel runs in ordinary manner.

The box hub $c$ carries a sprocket $e'$ driven by chain $c^2$ from the sprocket $c^3$ carried by a spindle $c^4$ rotatably mounted in the fork arm $f$, said spindle $c^4$ also carrying a sprocket $c^5$ driven by chain $c^6$ from pedal sprocket $d'$.

I claim:—

1. A unicycle including a fork for supporting the seat, a journal sleeve carried by one arm of the fork, an axle journaled in said sleeve and the other fork, a hub journalled on said sleeve and the axle, a driving connection between said axle and the hub, a clutch sleeve slidable on the journal sleeve, bevel gears rotatably mounted on the clutch sleeve, means carried by said clutch sleeve for alternately engaging said gears, a bevel wheel meshing with said gears, a screw rod carried by said wheel, a trip arm carried by said screw, a nut-box actuated by said screw, diametrical stays mounted on the cycle wheel and carrying the nut-box, a shifter rod for said clutch sleeve, a striking plate on one arm of the fork, a trip member on the shifter rod and controlled by said nut-box whereby it alternately engages with the striking plate and trip arm on the screw.

2. A unicycle including a fork for supporting the seat, a wheel arranged between the arms of the fork, diametrical stays carried by the wheel, a nut-box carried by said stays, a journal member carried by one arm of the fork, a crank axle mounted in said journal and the other arm of the fork, a clutch sleeve slidably but non-rotatably mounted on the journal sleeve, bevel gears rotatably mounted on said slidable clutch sleeve, a bevel wheel permanently in mesh with said bevel gears, a screw shaft connected to said bevel wheel and engaging said box nut, means controlled by said screw for shifting the slidable clutch sleeve to engage with one or the other of said bevel gears to automatically effect rotation of the screw shaft in either direction and thereby move the crank axle away from or towards the center of the wheel.

3. A unicycle including a fork for supporting the seat, a wheel arranged between the arms of the fork, a crank axle for driving said wheel journalled in the arms of the fork, and means for mounting said wheel whereby it may be shifted eccentric to the driving axle journalled in the forks.

4. A unicycle including a fork for supporting the seat, a wheel arranged between the arms of the fork, a crank axle for driving said wheel journalled in the arms of the fork, and means for mounting said wheel whereby it may be automatically shifted eccentric to the driving axle journalled in the forks, said means comprising diametrical stays carried by the wheel, a nut member carried by the stays and means actuated by the driving axle for moving the stays with reference to said driving axle thereby to impart to the wheel axle a gradually varying and eccentric position.

5. A unicycle including a fork for supporting a seat, a wheel arranged between the arms of the fork, a crank axle journalled in the forks, a diametrical guide carried by the wheel, a box hub slidable in said diametrical guide and having the driving axle journalled therein, a driving connection between the driving axle and the box hub, a fixed member in said guideway, and means actuated by said driving axle and connected with said fixed member in the guideway for permitting relatively eccentric shifting of the driving axle and the axis of the wheel.

In testimony whereof I have affixed my signature hereto this 5th day of July, 1922.

ARTHUR DELORAN ROBBINS.